(12) United States Patent
Fujiwara et al.

(10) Patent No.: US 7,285,508 B2
(45) Date of Patent: Oct. 23, 2007

(54) GLASS FLAKE (75) Inventors: Kosuke Fujiwara, Osaka (JP); Akihiro Koyama, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 714 days.

(21) Appl. No.: 10/836,513

(22) Filed: Apr. 30, 2004

(65) Prior Publication Data
US 2005/0049133 A1 Mar. 3, 2005

(30) Foreign Application Priority Data
Aug. 29, 2003 (JP) ............... 2003-209620

(51) Int. Cl.
C03C 12/00 (2006.01)
C03C 3/087 (2006.01)
B32B 17/00 (2006.01)
C08K 3/40 (2006.01)

(52) U.S. Cl. ............... 501/33; 501/69; 501/70; 106/489; 106/31.6; 106/31.95; 428/404; 428/406; 523/217; 523/527; 524/494

(58) Field of Classification Search ............... 501/33, 501/69, 70; 106/489, 31.6, 31.95; 428/404, 428/406; 523/217, 527; 524/494
See application file for complete search history.

(56) References Cited

U.S. PATENT DOCUMENTS

| 4,180,618 A | 12/1979 | Alpha et al. |
| 4,255,198 A | 3/1981 | Danielson et al. |
| 4,666,868 A * | 5/1987 | Dumbaugh, Jr. ............... 501/32 |
| 5,116,789 A | 5/1992 | Dumbaugh, Jr. et al. |
| 5,244,847 A | 9/1993 | Kushitani et al. |
| 5,854,152 A | 12/1998 | Kohli et al. |
| 2002/0004111 A1 | 1/2002 | Matsubara et al. |
| 2006/0048679 A1 * | 3/2006 | Fujiwara et al. ............ 106/482 |

FOREIGN PATENT DOCUMENTS

| EP | 0 220 818 | 5/1987 |
| JP | 56-84336 | 7/1981 |
| JP | 63-201041 | 8/1988 |
| JP | 1-126239 | 5/1989 |
| JP | 4-325435 | 11/1992 |
| JP | 5-826 | 1/1993 |
| JP | 5-232458 | 9/1993 |
| JP | 2000-247684 | 9/2000 |
| JP | 2001-213639 | 8/2001 |
| JP | 2003-12962 | 1/2003 |
| SU | 259337 | 4/1970 |
| SU | 440351 | 2/1975 |
| SU | 870365 | 11/1981 |
| SU | 988783 | 1/1983 |

* cited by examiner

Primary Examiner—Karl Group
(74) Attorney, Agent, or Firm—Hamre, Schumann, Mueller & Larson, P.C.

(57) ABSTRACT

The present invention provides a glass flake that is substantially free of boron trioxide ($B_2O_3$), barium oxide (BaO), zinc oxide (ZnO), and fluorine (F) and has sufficient heat resistance and good formability for glass flake. The glass flake of the present invention includes a glass composition that contains the following components, expressed in mol %; $50 \leq SiO_2 \leq 65$; $4 \leq Al_2O_3 < 12$; $5 \leq SrO \leq 25$; $10 < (MgO+SrO) \leq 30$; $20 \leq (MgO+CaO+SrO) \leq 45$; and $0 < (Li_2O+Na_2O+K_2O) < 2$; wherein the glass composition is substantially free of $B_2O_3$, BaO, ZnO, and F. This glass flake is useful for resin compositions, paints, cosmetics, ink compositions, and the like.

12 Claims, 4 Drawing Sheets

GLASS FLAKE

BACKGROUND OF THE INVENTION

1. Field of the Invention

The present invention relates to a glass flake, and further to resin compositions, paints, cosmetics, and ink compositions containing the glass flake.

2. Description of the Related Art

Glass flake is mixed in, for example, a resin matrix and improves the strength and dimensional accuracy of resin molded products. Glass flake is mixed in a paint as a lining material and applied onto surfaces of metals and concretes, and also is utilized in applications such as pigments and cosmetics.

Glass flake exhibits a metallic color when its surface is coated with a metal. It is also possible to provide glass flake with an interference color due to the interference of reflected light when the surface of the glass flake is coated with a metal oxide. The glass flakes on which a coating film of a metal or a metal oxide is formed are preferred for use in applications such as paints and cosmetics, in which color tones and gloss are seen as important. In the manufacturing step of coating the surface of glass flake with a metal or a metal oxide, the glass flake can be heated at high temperatures of 600° C. or higher after, for example, being coated by a liquid phase method.

As a composition suitable for glass flake, JP 63-201041A describes C glass, E glass, and a sheet glass composition. JP 2000-213639A describes a glass flake having good chemical durability. This glass flake has a glass composition that is free of diboron trioxide ($B_2O_3$) and fluorine (F), which are volatile components, and the content of alkali metal oxides is 5 mol % or less.

Figure 1:
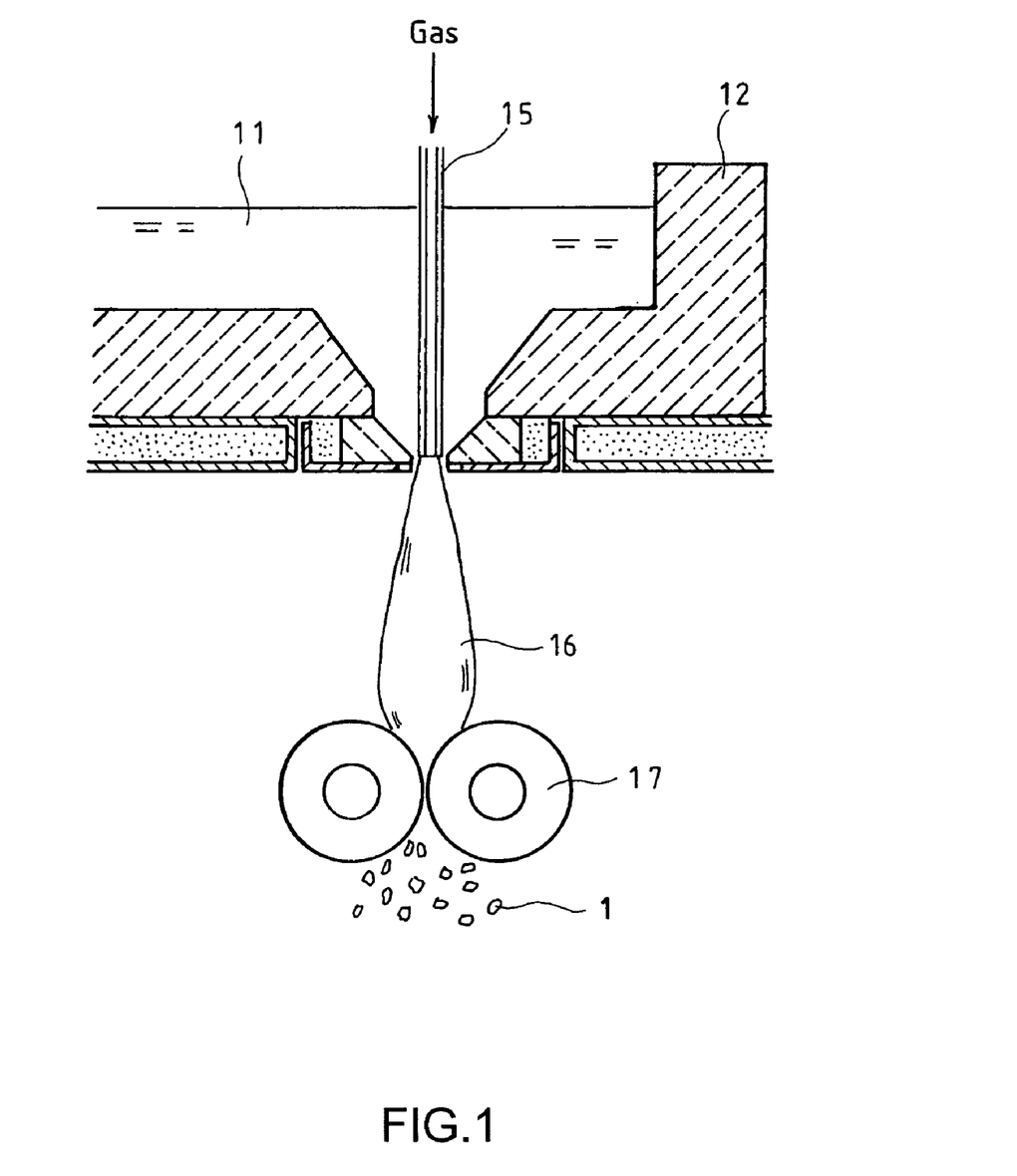
FIG. 1 is a cross-sectional view showing one example of an apparatus for manufacturing glass flake.

Glass flake can be fabricated with an apparatus shown in FIG. 1. In FIG. 1, a glass base 11 melted in a fire-resistant furnace bath 12 is inflated into a balloon-like shape by a gas that is supplied into a blow nozzle 15, forming a hollow glass film 16. The hollow glass film 16 is crushed by pressure rolls 17, forming a glass flake 1. The details of this apparatus are explained in, for example, JP 5-826A.

Taking the above-noted fabrication process into consideration, a glass flake is required to have good fusibility, appropriate temperature-viscosity characteristics, and a devitrification temperature lower than its working temperature. When the working temperature is too high, the glass flake becomes difficult to form; therefore, as for the temperature-viscosity characteristics of glass flake, a working temperature that is not exceedingly high, for example, a working temperature of 1300° C. or lower, is desirable.

Additionally, although not used in a glass flake, glass compositions that are free of diboron trioxide ($B_2O_3$), which is a volatile component, and have a small content of alkali metal oxides are known. JP 56-84336A describes a glass composition for sealing metal molybdenum. JP 1-126239A describes a glass substrate for electronic devices. JP 4-325435A describes a non-alkali glass. JP 5-232458A describes a glass for flat panel displays.

The present applicant has also proposed in JP 2000-247684A a glass composition that is free of ZnO, $B_2O_3$, and $F_2$, for glass fibers.

Among the glass flake compositions described in JP 63-201041A, the C glass composition and the E glass composition require diboron trioxide ($B_2O_3$) and/or fluorine (F) as their essential components, in order to adjust the devitrification temperature and viscosity. These components tend to vaporize easily; therefore, they scatter around the surrounding area when melted, contaminating the work environment, and they corrode furnace walls of a smelting furnace and a regenerative furnace, reducing the life of the furnaces. Moreover, the so-called sheet glass composition (soda-lime composition) contains large amounts of alkali metal oxides. Therefore, the heat resistance performance is insufficient.

A glass flake composition described in JP 2001-213639A is a glass in which the total content of magnesium oxide (MgO), zinc oxide (ZnO), strontium oxide (SrO), and barium oxide (BaO) is $1 \leq (MgO+ZnO+SrO+BaO) \leq 10$, that is, $(MgO+SrO) \leq 10$, expressed in mol %.

The glass composition disclosed in JP 2001-213639A contains zinc oxide (ZnO) or barium oxide (BaO) in many cases. However, zinc oxide (ZnO) easily vaporizes, and there has been a possibility that it may scatter around the surroundings when melted, contaminating the work environment. Moreover, another problem has been that because of the vaporization, the content in the glass is difficult to control. Therefore, it is preferable that zinc oxide (ZnO) not be used.

Moreover, in recent years, glass that does not use barium oxide (BaO) has been demanded due to considerations about the environment and human health. For this reason, it is preferable that barium oxide (BaO) not be used.

The glass shown as No.2 in Table 1 in JP 56-84336A contains a large amount of silicon dioxide ($SiO_2$) at 62.2% in weight %, which is 70.0% when converted in mol %. The glass described in JP 1-126239A contains a large amount of aluminum oxide ($Al_2O_3$). The glasses described in JP 4-325435A and JP 5-232458A do not contain alkali metal oxides. For these reasons, all the glasses described in JP 56-84336A, JP 1-126239A, JP 4-325435A, and JP 5-232458A have high working temperatures, and glass flake is difficult to form.

All the Examples in JP 56-84336A contain barium oxide (BaO). All the Examples in JP 4-325435A contain boron trioxide ($B_2O_3$).

All the Examples in JP 1-126239A have a working temperature of 1399° C. or higher.

SUMMARY OF THE INVENTION

An object of the present invention is to provide a glass flake using a glass composition that is substantially free of diboron trioxide ($B_2O_3$), barium oxide (BaO), zinc oxide (ZnO), and fluorine (F), and has sufficient heat resistance and good formability.

The present invention provides a glass flake including a glass composition containing the following components, expressed in mol %;

$50 \leq SiO_2 \leq 65$;

$4 \leq Al_2O_3 < 12$;

$5 \leq SrO \leq 25$;

$10 < (MgO+SrO) \leq 30$;

$20 \leq (MgO+CaO+SrO) \leq 45$; and $0 < (Li_2O+Na_2O+K_2O) < 2$, wherein the glass composition is substantially free of $B_2O_3$, BaO, ZnO, and F.

In the present specification, the term "substantially free" is intended to permit the presence of a trace amount of component that comes to be mixed in the glass composition from raw materials or the like, and it means, for example, that the content of the component expressed in mol % is less than 0.5%, preferably less than 0.1%. In the above-described glass composition, not the total of $B_2O_3$, BaO, ZnO, and F, but the content of each one of these components is less than 0.5%.

DETAILED DESCRIPTION OF THE INVENTION

Figure 2A:
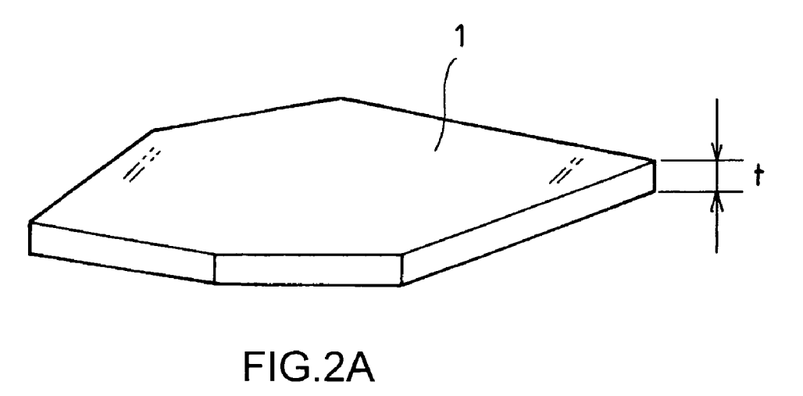
FIG. 2A is a perspective view showing one embodiment of a glass flake according to the present invention.
Figure 2B:
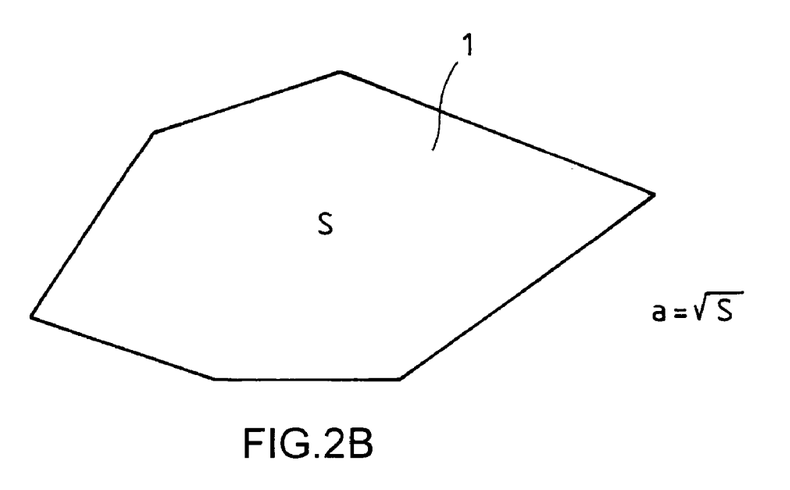
FIG. 2B is a plan view the same embodiment.

In the present specification, a glass flake 1 refers to thin flake-shaped particles having an average thickness t of 0.1-100 µm and an aspect ratio (average particle diameter a/average thickness t) of 2-1000 (see FIG. 2A). Herein, average particle diameter a is defined as the square root of the area S of the glass flake 1 when viewed in plan (see FIG. 2B).

Also, working temperature is a temperature of a glass when the viscosity is 100 Pa·sec (1000 poise).

Hereinafter, all the percentages that indicate glass compositions are expressed in mol %.

The glass composition in the present invention has the above-described composition, but it is preferable that MgO and CaO be in the ranges $0 \leq MgO \leq 15$ and $10 \leq CaO \leq 35$.

It is preferable that $SiO_2$, $Al_2O_3$, MgO, CaO, and SrO in the glass composition in the present invention be in the ranges $55 \leq SiO_2 \leq 65$, $4 \leq Al_2O_3 \leq 10$, $0 \leq MgO \leq 10$, $10 \leq CaO \leq 30$, and $5 \leq SrO \leq 20$, respectively. In addition, it is preferable that MgO+SrO and MgO+CaO+SrO be in the ranges $10 < (MgO+SrO) \leq 20$ and $25 \leq (MgO+CaO+SrO) \leq 35$.

The working temperature for the glass composition according to the present invention is preferably 1250° C. or less.

The temperature difference obtained by subtracting the devitrification temperature from the working temperature of the glass composition in the present invention is preferably at least 50° C.

The glass flake of the present invention further may include a coating film, formed on a surface of the glass composition, of at least one selected from a metal and a metal oxide.

In this case, the metal is preferably at least one metal selected from the group consisting of nickel, gold, silver, platinum, and palladium.

The metal oxide is preferably a metal oxide containing at least one metal selected from the group consisting of titanium, aluminum, iron, cobalt, chromium, zirconium, zinc, tin, and silicon.

The present invention encompasses a resin composition, a paint, a cosmetic product, and an ink composition that contain the glass flake of the present invention.

Hereinbelow, the components in the glass flake according to the present invention are discussed in detail.

($SiO_2$)

Silicon dioxide ($SiO_2$) is the main component that forms the skeleton of glass and also is a component that improves acid resistance. If the content of $SiO_2$ is less than 50%, acid resistance of glass degrades. On the other hand, if it exceeds 65%, the melting point of glass becomes high and it becomes difficult to melt raw materials uniformly.

Accordingly, it is preferable that $SiO_2$ be in the range $50 \leq SiO_2 \leq 65$. A more preferable range is $55 \leq SiO_2 \leq 65$, and a still more preferable range is $60 < SiO_2 \leq 65$.

($Al_2O_3$)

Aluminum oxide ($Al_2O_3$) is a component that adjusts the devitrification temperature and viscosity in forming glass, and also is a component that improves water resistance. If $Al_2O_3$ is less than 4%, sufficient effects cannot be obtained to adjust the devitrification temperature and viscosity, nor to improve the water resistance. On the other hand, if the content of $Al_2O_3$ is 12% or more, the melting point of glass becomes high and it becomes difficult to melt raw materials uniformly; therefore, glass is difficult to form.

Therefore, it is preferable that $Al_2O_3$ be in the range $4 \leq Al_2O_3 < 12$. A more preferable range is $4 \leq Al_2O_3 \leq 10$.

($B_2O_3$)

In the present invention, diboron trioxide ($B_2O_3$) is substantially not allowed to be present.

(MgO, CaO, SrO)

Magnesium oxide (MgO) and calcium oxide (CaO) are components that adjust the devitrification temperature and viscosity in forming glass. Strontium oxide (SrO) is a component that adjusts the devitrification temperature and viscosity in forming glass, and it also is known as a component that increases X-ray absorbing performance of the glass. In the present invention, it has been found that, by particularly restricting SrO, (MgO+SrO), and (MgO+CaO+SrO) within the foregoing composition ranges, the devitrification temperature can be greatly reduced and a glass that can easily form glass flake can be obtained.

When the content of SrO is less than 5%, sufficient effects cannot be obtained to adjust the devitrification temperature and viscosity. On the other hand, when it exceeds 25%, the devitrification temperature rises, and therefore the glass flake is difficult to form.

Therefore, it is preferable that SrO be in the range $5 \leq SrO \leq 25$. A more preferable range is $5 \leq SrO \leq 20$.

When the total of the contents of MgO and SrO is 10% or less, sufficient effects cannot be obtained to adjust the devitrification temperature and viscosity. On the other hand, when it exceeds 30%, the devitrification temperature rises, and therefore, the glass flake is difficult to form.

Therefore, it is preferable that MgO and SrO be within the range $10 < (MgO+SrO) \leq 30$. A more preferable range is $10 < (MgO+SrO) \leq 20$.

If the total of the contents of MgO, CaO, and SrO is less than 20%, sufficient effects cannot be obtained to adjust the devitrification temperature and viscosity. On the other hand, if it exceeds 45%, the devitrification temperature rises, and the glass flake is difficult to form.

For these reasons, it is preferable that MgO, CaO, and SrO be within the range $20 \leq (MgO+CaO+SrO) \leq 45$. A more preferable range is $25 \leq (MgO+CaO+SrO) \leq 35$.

MgO is not an essential component, and if the content thereof exceeds 15%, the devitrification temperature rises and the glass flake may become difficult to form.

Therefore, it is preferable that MgO be within the range $0 \leq MgO \leq 15$. A more preferable range is $0 \leq MgO \leq 10$.

When the content of CaO is less than 10%, sufficient effects cannot be obtained to adjust the devitrification temperature and viscosity. On the other hand, when it exceeds 35%, the devitrification temperature rises, and the glass flake is difficult to form.

Therefore, it is preferable that CaO be within the range $10 \leq CaO \leq 35$. A more preferable range is $10 \leq CaO \leq 30$.

(BaO)

In the present invention, barium oxide (BaO) is substantially not allowed to be present. However, it may come to be mixed in as an impurity of raw materials.

(ZnO)

In the present invention, zinc oxide (ZnO) is substantially not allowed to be present.

($Li_2O$, $Na_2O$, $K_2O$)

Alkali metal oxides ($Li_2O$, $Na_2O$, and $K_2O$) are components that adjust the devitrification temperature and viscosity in forming glass. If the content of the alkali metal oxides is 2% or more, the glass transition temperature lowers, degrading the heat resistance of the glass. On the other hand, if the alkali metal oxides are not present at all, the melting point of glass becomes high; therefore, it becomes difficult to melt raw materials uniformly and the glass flake is difficult to form.

Therefore, it is preferable that $Li_2O$, $Na_2O$, and $K_2O$ be in the range $0 < (Li_2O + Na_2O + K_2O) < 2$.

($ZrO_2$)

Zirconium oxide ($ZrO_2$) increases the devitrification growth rate of glass, and often makes it difficult to form the glass flake stably. In the present invention, it is preferable that $ZrO_2$ not be present, but a $ZrO_2$ content of up to 5% is permissible.

(F)

In the present invention, fluorine (F) is substantially not allowed to be present.

(Fe)

When present in glass, iron (Fe) normally exists in the state of an iron oxide (FeO or $Fe_2O_3$). $Fe_2O_3$ is a component that enhances ultraviolet absorbing properties of glass, and FeO is a component that enhances heat-ray absorbing properties. Although iron (Fe) is not an essential component, it may be used as a component for adjusting optical characteristics of the glass and may be added to the glass composition within such a range that the content of $Fe_2O_3$ in terms of the total iron does not exceed 5%.

($TiO_2$)

Titanium oxide ($TiO_2$) is a component that improves fusibility and chemical durability of glass and enhances ultraviolet absorbing properties of glass. Although $TiO_2$ is not an essential component, it may be used as a component for adjusting optical characteristics and may be added to the glass composition within the range not exceeding 5%.

($SO_3$)

Although sulfur trioxide ($SO_3$) is not an essential component, it may be used as a clarifying agent and may be added to the glass composition within the range not exceeding 5%.

In addition to the components shown as examples above, CoO, $CeO_2$, or the like may be added to the glass composition preferably within the range not exceeding 5%.

Figure 3:
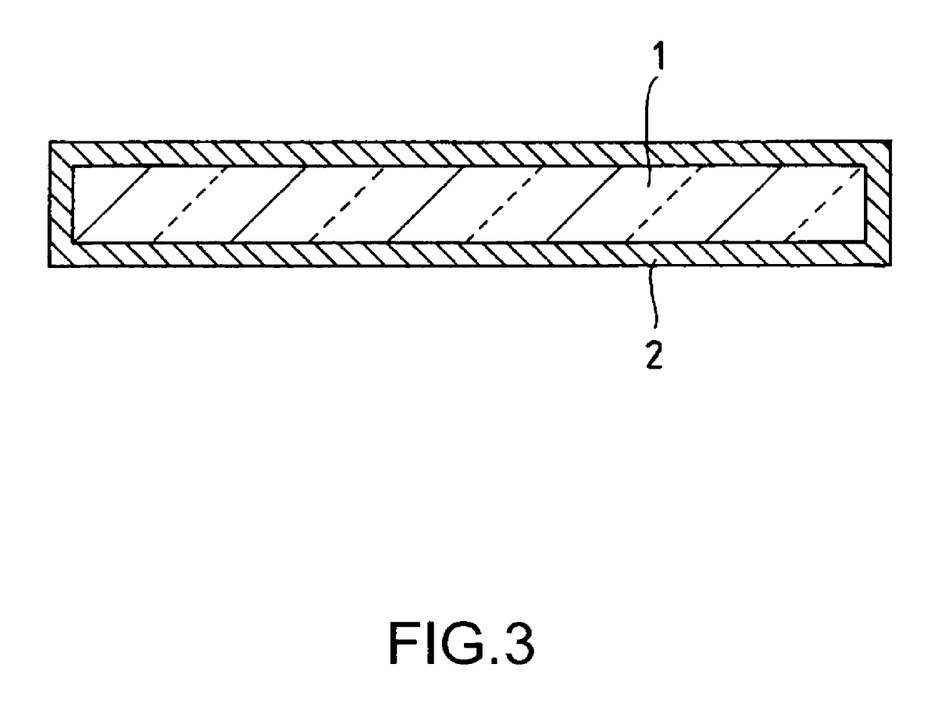
FIG. 3 is a cross-sectional view showing one embodiment of a glass flake, according to the present invention, having a coating.

Using the above-described glass flake 1 as a base material, a coating 2 of a metal or a metal oxide may be formed on the surface thereof (see FIG. 3). The coating 2 may be either a single layer or plural layers. The metal is not particularly limited, but is preferably at least one metal selected from nickel, gold, silver, platinum, and palladium.

In addition, the metal oxide is not particularly limited either, but preferable are metal oxides containing at least one metal selected from titanium, aluminum, iron, cobalt, chromium, zirconium, zinc, tin, and silicon; that is, for example, titanium dioxide, aluminum oxide, iron oxide, chromium oxide, cobalt oxide, zirconium oxide, zinc oxide, tin oxide, and silicon dioxide. It is possible to form layers of a metal thin film and a metal oxide thin film successively. The thickness of the coating may be selected as appropriate for application, and the coating may be carried out by a commonly known method, such as a sputtering method, a sol-gel method, a CVD method, and a liquid phase method in which an oxide is precipitated from a metal salt on the surface thereof.

A preferable metal oxide for coating is titanium dioxide, which has a high refractive index and high transparency and exhibits good interference colors.

Figure 4:
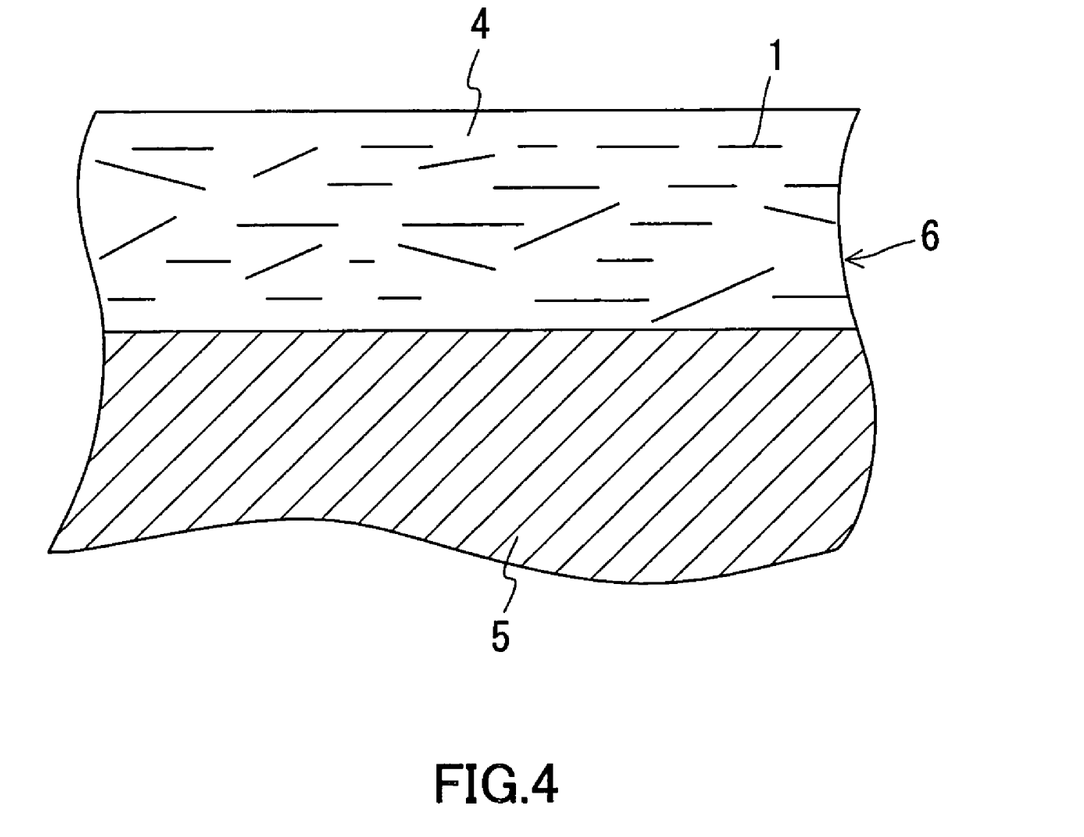
FIG. 4 is a cross-sectional view showing one example of a resin composition containing a glass flake according to the present invention.

This glass flake is mixed as a pigment or a reinforcing filler into resin compositions, paints, cosmetic products, ink compositions, and the like by a known technique, and it enhances their color tones and gloss and improves their dimensional accuracy and strength. FIG. 4 shows a schematic cross-sectional view of an example in which the glass flake 1 is mixed with a paint and coated on a surface of a substrate 5. The glass flake 1 is dispersed in a resin matrix 4 of a paint film 6.

The resin compositions, paints, cosmetic products, and ink compositions may be selected and used as appropriate according to the purposes, as long as they are commonly known ones. The mixing ratio of the glass flake with the resin compositions, the paints, the cosmetic products, or the ink compositions may also be appropriately selected. There are no limitations on the method of mixing either.

For example, in cases where the glass flake is mixed in a paint, it is possible to select and use a thermosetting resin and a thermoplastic resin, as well as a hardening agent, as appropriate, for the base resin material.

Examples of the thermosetting resins include acrylic resins, polyester resins, epoxy resins, phenolic resins, urea resins, fluororesins, cured polyester-urethane resins, cured epoxy-polyester resins, acrylic-polyester-based resins, polyester resins, cured acrylic-urethane resins, cured acrylic-melamine resins, and cured polyester-melamine resins.

Examples of the thermoplastic resins include polyethylene resins, polypropylene resins, petroleum resins, thermoplastic polyester resins, and thermoplastic fluororesins.

Examples of the hardening agents include, polyisocyanates, amines, polyamides, polybasic acids, acid anhydrides, polysulfides, trifluoroboric acids, acid dihydrazides, and imidazoles.

When the glass flake is mixed into a resin composition, a variety of the above-noted thermosetting resins or thermoplastic resins may be used for the base resin material.

Examples of the ink compositions include inks for writing tools such as various ballpoint pens and felt-tip pens, and printing inks such as rotogravure inks and offset lithographic inks, and any of the ink compositions are usable.

A vehicle that constitutes an ink composition serves the function of dispersing a pigment and fixing it onto paper. The vehicle is made of a resin, an oil component, a solvent, and the like.

The vehicle of inks for writing tools contains, as a resin, acrylic resin, styrene-acrylic copolymer, polyvinyl alcohol, polyacrylate, vinyl acetate-acrylic copolymer, or a microorganism-derived polysaccharide such as xanthan gum, or water-soluble vegetable polysaccharide such as guar gum. It further contains water, alcohol, hydrocarbon, ester, or the like, as a solvent.

The vehicle for rotogravure inks contains, as a resin, gum rosin, wood rosin, tall oil rosin, lime rosin, rosin ester, maleic acid resin, polyamide resin, vinyl resin, nitrocellulose, cellulose acetate, ethyl cellulose, chlorinated rubber, cyclized rubber, ethylene-vinyl acetate copolymer resin, urethane resin, polyester resin, alkyd resin, a resin mixture such as gilsonite, dammar, and shellac, a mixture of the above-noted resins, a water-soluble resin in which any of the above-noted resins is made soluble in water, or a water-based emulsion resin. It further contains hydrocarbon, alcohol, ether, ester, water, or the like, as a solvent.

The vehicle for offset lithographic inks contains: as a resin, rosin modified phenolic resin, petroleum resin, alkyd resin, a dry modified resin thereof, or the like; and, as an oil content, vegetable oil such as linseed oil, tung oil, and soybean oil. It further contains n-paraffin, isoparaffin, aromatic, naphthene, a-olefin, water, or the like, as a solvent.

It should be noted that commonly-used additives such as dyes, pigments, a variety of surfactants, lubricants, antifoaming agents, and leveling agents may be selected as appropriate and mixed into the above-mentioned various vehicle components.

The cosmetic products include a wide range of cosmetic products such as facial cosmetic products, make-up cosmetic products, and hair cosmetic products. Among these, this glass flake is particularly suitably used for make-up cosmetic products such as foundations, facial powders, eye shadows, blushers, make-up bases, nail enamels, eye-liners, mascaras, lipsticks, and body powders.

Depending on the purposes of the cosmetic products, the glass flake may be subjected to a hydrophobic treatment. Examples of the method of the hydrophobic treatment include the following five methods:

(1) a treatment method using a silicone compound such as methyl hydrogen polysiloxane, a high viscosity silicone oil, and a silicone resin;

(2) a treatment method using a surfactant such as an anionic surfactant and a cationic surfactant;

(3) a treatment method using a polymer compound such as nylon, polymethyl methacrylate, polyethylene, a variety of fluororesins (for example, polytetrafluoroethylene resin (PTFE), tetrafluoroethylene-perfluoroalkylvinylether copolymer (PFA), tetrafluoroethylene-hexafluoropropylene copolymer (FEP), tetrafluoroethylene-ethylene copolymer (ETFE), polyvinylidene fluoride (PVDF), polychloro-trifluoroethylene (PCTFE), and a polyamino acid;

(4) a treatment method using a perfluoro group-containing compound, a lecithin, a collagen, a metallic soap, a lipophilic wax, a partial or a complete ester of polyhydric alcohol, or the like; and (5) a treatment method in which these are used in combination.

It should be noted, however, that methods other than the above-noted methods may be used as long as the methods are generally applicable to a hydrophobic treatment for powder.

With these cosmetic products, other materials generally used for cosmetic products may be mixed as appropriate. Examples include inorganic powders, organic powders, pigments or coloring agents, hydrocarbons, esters, oil components, organic solvents, resins, plasticizers, ultraviolet absorbers, antioxidants, preservatives, surfactants, moisturizing agents, perfume materials, water, alcohols, and thickening agents.

Examples of the inorganic powder include talc, kaoline, sericite, muscovite, phlogopite, lepidolite, biotite, lithia mica, vermiculite, magnesium carbonate, calcium carbonate, diatomaceous earth, magnesium silicate, calcium silicate, aluminum silicate, barium silicate, barium sulfate, strontium silicate, metal salts of tungstic acid, silica, hydroxyapatite, zeolite, boron nitride, and ceramic powder.

Examples of the organic powder include nylon powder, polyethylene powder, polystyrene powder, benzoguanamine powder, polytetrafluoroethylene powder, distyrene-benzene polymer powder, epoxy powder, acrylic powder, and microcrystalline cellulose.

Pigments are generally classified into the following: inorganic pigments and organic pigments.

Examples of the inorganic pigments include the following, grouped by colors:

inorganic white pigments: titanium oxide, zinc oxide, etc.
inorganic reddish pigments: iron oxide (iron red), iron titanate, etc.
inorganic brownish pigments: y iron oxide, etc.
inorganic yellowish pigments: yellow iron oxide, loess, etc.
inorganic blackish pigments: black iron oxide, carbon black, etc.
inorganic violetish pigments: mango violet, cobalt violet, etc.
inorganic greenish pigments: chromium oxide, chromium hydroxide, cobalt titanate, etc.
inorganic bluish pigment: ultramarine blue, Prussian blue, etc.

In addition, as pearl pigments, examples include titanium oxide-coated mica, titanium oxide-coated bismuth oxychloride, bismuth oxychloride, titanium oxide-coated talc, fish scale guanine, and colored titanium oxide-coated mica.

Further, as metallic powder pigments, examples include aluminum powder and copper powder.

The organic pigments include the following:
Red 201, Red 202, Red 204, Red 205, Red 220, Red 226, Red 228, Red 405, Orange 203, Orange 204, Yellow 205, Yellow 401, Blue 404, etc.

Further examples include organic pigments in which dyes such as those listed below are made into a lake with an extender such as talc, calcium carbonate, barium sulfate, zirconium oxide or aluminum white.

Red 3, Red 104, Red 106, Red 227, Red 230, Red 401, Red 505, Orange 205, Yellow 4, Yellow 5, Yellow 202, Yellow 203, Green 3, Blue 1, etc.

Moreover, examples of the coloring agents include natural coloring agents such as chlorophyll and B-carotin.

Examples of the hydrocarbons include the following:
Squalane, liquid paraffin, vaseline, microcrystalline wax, ozokerite, ceresin, myristic acid, palmitic acid, stearic acid, oleic acid, isostearic acid, cetyl alcohol, hexadecyl alcohol, oleyl alcohol, cetyl 2-ethylhexanoate, 2-ethylhexyl palmitate, 2-octyldodecyl myristate, neopentylglycol di-2-ethylhexanoate, glycerol tri-2-ethylhexanoate, 2-octyldodecyl oleate, isopropyl myristate, glycerol triisostearate, glycerol tricoconut oil aliphatic monocarboxylate, olive oil, avocado oil, beeswax, myristyl myristate, mink oil, lanoline, etc.

Further, examples of the oil components include silicone oils, higher fatty acids, esters of fats and oils, higher alcohols, and waxes. Moreover, the organic solvents may include acetone, toluene, butyl acetate, and acetic ester, the resins may include alkyd resin and urea resin, and the plasticizers may include camphor and acetyl tributyl citrate. Furthermore, ultraviolet absorbers, antioxidants, preservatives, surfactants, moisturizing agents, perfume materials, water, alcohols, thickening agents, and the like may be given as examples.

The form of the cosmetic products is not particularly limited, and examples include a powder form, a cake-like form, a pencil-like form, a stick-like form, an ointment form, a liquid form, an emulsion form, and a cream-like form.

The physical properties of the glass flake of the present invention are discussed in detail below.

A temperature (working temperature) at which the viscosity of molten glass is 100 Pa·sec (1000 poise) is the most suitable temperature for forming the glass flake. When the working temperature exceeds 1300° C., the manufacturing equipment for the glass tends to suffer from corrosion due to heat, reducing the life of the equipment. The lower the working temperature is, the less the cost for fuel when melting glass materials, and the temperature is preferably 1250° C. or less.

The larger the temperature difference ($\Delta T$) obtained by subtracting the devitrification temperature from the working temperature is, the more unlikely it is that devitrification occurs during the glass formation; and a glass flake more uniform in quality can be produced at high yield. Here, the term "devitrification" means crystals form and grow in molten glass and the molten glass becomes white and turbid.

The glass flake of the present invention, which is composed of a glass in which $\Delta T$ (=working temperature−devitrification temperature) is 50° C. or higher, can be produced at high performance and good yield using conventional manufacturing equipment. It is more preferable that $\Delta T$ be 60° C. or higher.

Moreover, the glass flake of the present invention does not change its shape even when it is subjected to a processing accompanying a high-temperature heating, because its glass transition temperature can be 600° C. or higher. Therefore, it is possible to produce a glass flake suitable for coating of a metal or a metal oxide.

Since the glass flake of the present invention is excellent in heat resistance performance, deformation during high-temperature heating can be suppressed. In addition, it is substantially free of diboron trioxide ($B_2O_3$), barium oxide (BaO), zinc oxide (ZnO), and fluorine (F) and therefore does not contaminate the surrounding work environment when producing the glass flake.

Also, by coating the surface of this glass flake with a metal or a metal oxide, it can be used as a pigment.

Furthermore, this glass flake can be used for resin compositions, paints, cosmetic products, and ink compositions.

EXAMPLES

Examples 1-10 and Comparative Examples 1-5

General glass materials such as silica sand were blended so that the compositions shown in the following Tables 1 and 2 were obtained, and respective batches were prepared for each of Examples and Comparative Examples. These batches were heated to 1400° C. to 1600° C. to melt them using an electric furnace, and were kept as they were for a predetermined time until the compositions became uniform. Thereafter, the melted glass was poured on an iron plate and gradually cooled by slowly cooling it to room temperature, and glass samples were obtained.

With the glasses thus prepared, their glass transition temperatures were obtained from their thermal expansion curves. In addition, their working temperatures were obtained by a general platinum ball-pulling method. Further, the glasses crushed to 1.0 to 2.8 mm in particle diameter were put into a platinum boat and kept in an electric furnace with a temperature gradient for 2 hours. Devitrification temperatures were obtained from the highest temperatures of the locations at which crystals started to form.

These measurement results are shown in the following Tables 1 and 2. It should be noted that all the glass compositions in the tables are expressed in mol %. $\Delta T$ denotes temperature difference obtained by subtracting devitrification temperature from working temperature.

TABLE 1

(%, ° C.)

| Ex. | 1 | 2 | 3 | 4 | 5 | 6 | 7 | 8 | 9 | 10 |
|---|---|---|---|---|---|---|---|---|---|---|
| $SiO_2$ | 60.2 | 61.2 | 61.2 | 59.0 | 63.2 | 61.2 | 61.1 | 60.9 | 62.0 | 62.2 |
| $Al_2O_3$ | 7.7 | 6.7 | 6.7 | 6.7 | 4.7 | 6.7 | 6.7 | 6.7 | 6.7 | 5.7 |
| MgO | 5.1 | 5.1 | 5.1 | 5.5 | 5.1 | 3.5 | 5.1 | 5.1 | 5.1 | 5.1 |
| CaO | 21.3 | 16.3 | 11.3 | 12.0 | 11.3 | 12.9 | 16.3 | 16.3 | 20.6 | 16.4 |
| SrO | 5.0 | 10.0 | 15.0 | 16.0 | 15.0 | 15.0 | 10.0 | 10.0 | 5.0 | 10.0 |
| $Li_2O$ | — | — | — | — | — | — | 0.4 | — | — | — |
| $Na_2O$ | 0.4 | 0.4 | 0.4 | 0.5 | 0.4 | 0.4 | 0.4 | 0.8 | 0.4 | 0.4 |
| $K_2O$ | 0.2 | 0.2 | 0.2 | 0.2 | 0.2 | 0.2 | — | 0.2 | 0.2 | 0.2 |
| $TiO_2$ | — | — | — | 0.1 | 0.1 | 0.1 | — | — | — | — |
| $Fe_2O_3$ | 0.1 | 0.1 | 0.1 | — | — | — | — | — | — | — |
| Glass transition temperature | 740 | 734 | 727 | 730 | 725 | 733 | 715 | 730 | 742 | 733 |
| Working temperature | 1237 | 1242 | 1237 | 1213 | 1230 | 1235 | 1221 | 1226 | 1246 | 1234 |
| Devitrification temperature | 1180 | 1163 | 1137 | 1162 | 1180 | 1183 | 1158 | 1160 | 1189 | 1184 |
| $\Delta T$ | 57 | 79 | 100 | 51 | 50 | 52 | 63 | 66 | 57 | 50 |

TABLE 2

(%, ° C.)

| Comp. Ex. | 1 | 2 | 3 | 4 | 5 |
|---|---|---|---|---|---|
| $SiO_2$ | 72.2 | 58.0 | 70.0 | 66.7 | 65.0 |
| $Al_2O_3$ | 1.1 | 4.0 | 10.0 | 7.8 | 8.0 |
| $B_2O_3$ | — | — | — | 1.0 | — |
| MgO | 5.3 | 3.8 | 5.0 | — | — |

TABLE 2-continued

| Comp. Ex. | 1 | 2 | 3 | 4 | (%, °C.) 5 |
|---|---|---|---|---|---|
| CaO | 8.1 | 29.9 | 10.0 | 15.5 | — |
| SrO | — | 1.9 | tr. | 9.0 | 27.0 |
| BaO | — | — | 5.0 | — | — |
| $Na_2O$ | 12.7 | 1.9 | — | — | — |
| $K_2O$ | 0.6 | 0.5 | — | — | — |
| Glass transition temperature | 553 | 699 | 786 | 752 | 760 |
| Working temperature | 1172 | 1228 | 1470 | 1335 | 1354 |
| Devitrification temperature | 1020 | 1338 | 1275 | 1194 | 1150 |
| ΔT | 152 | −110 | 195 | 141 | 204 | tr.: < 0.05%

The glass prepared in Comparative Example 1 is composed of a sheet glass composition (soda-lime composition) that has been supplied conventionally. It is understood, however, that the glass transition temperature of this glass is less than 600° C. and the heat resistance performance is insufficient.

In addition, Comparative Example 2 is one example of, among the compositions of the above-described JP 2001-213639A, the glass that is free of $B_2O_3$, BaO, ZnO, $ZrO_2$, and F. However, the devitrification temperature of this glass is higher than the formation temperature, and it is difficult to form the glass into glass flake.

Comparative Example 3 is a glass composed of the composition described as 2 in the above-described JP 56-84336A. Likewise, Comparative Example 4 is a glass composed of a composition described in Examples in the above-described JP 4-325435A. Further, Comparative Example 5 is a glass composed of a composition described in Examples of the above-described JP 5-232458A. The working temperatures of these glasses exceed 1300° C., and therefore, it is difficult to form the glasses into glass flake.

The glasses of Examples 1 to 10 were melted in the above-described method and thereafter formed into pellets while being cooled. As an example, these pellets were charged into an apparatus described in JP 5-826A, which was proposed by the present applicant earlier, that is, an apparatus for producing glass flake (flaked glass) in which a molten glass material was blown up in a hollow state by a blow gas and formed into a thin film, and thereafter the glass thin film is crushed by pressure rolls, and production conditions were adjusted as appropriate so that the average thickness results in 1 μm; thus, glass flakes were produced.

Examples 11 and 12

The glass flakes of Examples 2 and 9 thus produced were crushed to have an appropriate particle diameter and thereafter coated with titanium dioxide according to the method described in JP 2003-12962A, that is, the liquid phase method in which titanium dioxide is precipitated from a metal salt on the surface of glass flake. These glass flakes were observed with an electron microscope, and it was confirmed that a coating film of titanium dioxide was formed on the glass flake surface.

Examples 13 and 14

The glass flakes of Examples 2 and 9 were crushed to have an appropriate particle diameter and thereafter coated with silver using a general electroless plating method described in JP 2003-12962A. These glass flakes were observed with an electron microscope, and it was confirmed that a coating film of silver is formed on the glass flake surface.

Examples 15 and 16

The glass flakes of Examples 2 and 9 were crushed to have an appropriate particle diameter and thereafter mixed with a polyester resin, and polyester resin compositions containing the glass flakes were obtained.

Examples 17 and 18

The glass flakes of Examples 11 and 12 were mixed with epoxy acrylate, and vinyl ester-based paints containing the glass flakes were obtained.

Examples 19 and 20

The glass flakes of Examples 11 and 12 were mixed with a foundation, which is a facial cosmetic product, and cosmetic products containing the glass flakes were obtained.

Examples 21 and 22

The glass flakes of Examples 11 and 12 were mixed with an ink composition in which a coloring agent, a resin, and an organic solvent were blended as appropriate, and ink compositions containing the glass flakes were obtained.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass flake comprising:
a glass composition containing the following components, expressed in mol %;
$50 \leq SiO_2 \leq 65$;
$4 \leq Al_2O_3 < 12$;
$5 \leq SrO \leq 25$;
$10 < (MgO+SrO) \leq 30$;
$20 \leq (MgO+CaO+SrO) \leq 45$; and
$0 < (Li_2O+Na_2O+K_2O) < 2$,
wherein the glass composition is substantially free of $B_2O_3$, BaO, ZnO, and F.

2. The glass flake according to claim 1, wherein MgO and CaO in the glass composition are in the following respective ranges, expressed in mol %,
$0 \leq MgO \leq 15$, and
$10 \leq CaO \leq 35$.

3. The glass flake according to claim 1, wherein:
$SiO_2$, $Al_2O_3$, MgO, CaO, and SrO in the glass composition are in the ranges, expressed in mol %,
$55 \leq SiO_2 \leq 65$,
$4 \leq Al_2O_3 \leq 10$,
$0 \leq MgO \leq 10$,
$10 \leq CaO \leq 30$, and
$5 \leq SrO \leq 20$; and
MgO+SrO and MgO+CaO+SrO are in the ranges, expressed in mol %, 10<(MgO+SrO)≦20, and
25≦(MgO+CaO+SrO)≦35.

4. The glass flake according to claim 1, wherein a working temperature of the glass composition is 1250° C. or lower.

5. The glass flake according to claim 1, wherein a temperature difference obtained by subtracting a devitrification temperature of the glass composition from a working temperature thereof is at least 50° C.

6. The glass flake according to claim 1, further comprising a coating film, formed on a surface of the glass composition, of at least one selected from a metal and a metal oxide.

7. The glass flake according to claim 6, wherein the metal is at least one metal selected from the group consisting of nickel, gold, silver, platinum, and palladium.

8. The glass flake according to claim 6, wherein the metal oxide is a metal oxide containing at least one metal selected from the group consisting of titanium, aluminum, iron, cobalt, chromium, zirconium, zinc, tin, and silicon.

9. A resin composition comprising a glass flake according to claim 1.

10. A paint comprising a glass flake according to claim 1.

11. A cosmetic product comprising a glass flake according to claim 1.

12. An ink composition comprising a glass flake according to claim 1.

* * * * *